US006740702B2

(12) United States Patent
Nishida et al.

(10) Patent No.: US 6,740,702 B2
(45) Date of Patent: May 25, 2004

(54) COATING LIQUID FOR FORMING INK-RECEIVING LAYER

(75) Inventors: Hiroyasu Nishida, Kitakyushu (JP); Mitsuru Nakai, Kitakyushu (JP); Michio Komatsu, Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 10/172,916

(22) Filed: Jun. 17, 2002

(65) Prior Publication Data

US 2003/0031840 A1 Feb. 13, 2003

Related U.S. Application Data

(62) Division of application No. 09/220,134, filed on Dec. 23, 1998, now Pat. No. 6,447,881.

(30) Foreign Application Priority Data

Dec. 26, 1997 (JP) ........................................... 9-361212

(51) Int. Cl.[7] ................................................ C08K 3/36
(52) U.S. Cl. .................................. 524/492; 106/287.34
(58) Field of Search ................................ 524/492, 493, 524/557; 106/600, 737, 287.34, 490

(56) References Cited

U.S. PATENT DOCUMENTS

| | | | | | |
|---|---|---|---|---|---|
| 4,395,445 | A | * | 7/1983 | Gebauer et al. | 427/407.1 |
| 4,460,637 | A | | 7/1984 | Miyamoto et al. | |
| 4,931,491 | A | * | 6/1990 | Savin | 523/443 |
| 5,002,825 | A | | 3/1991 | Mimura et al. | |
| 5,264,275 | A | | 11/1993 | Misuda et al. | |
| 5,466,742 | A | * | 11/1995 | Wagner et al. | 524/448 |
| 5,521,002 | A | | 5/1996 | Sneed | |
| 5,612,281 | A | | 3/1997 | Kobayashi et al. | |
| 5,691,046 | A | | 11/1997 | Matsubara et al. | |
| 6,187,419 | B1 | * | 2/2001 | Kijimuta et al. | 428/212 |
| 6,436,513 | B1 | * | 8/2002 | Kitamura et al. | 428/195 |

FOREIGN PATENT DOCUMENTS

| | | | | |
|---|---|---|---|---|
| EP | 0 484 016 | A1 | | 10/1991 |
| EP | 0 524 626 | A1 | | 7/1992 |
| EP | 0 634 284 | A1 | | 7/1994 |
| EP | 0 742 108 | A1 | | 5/1996 |
| EP | 803374 | A2 | * | 10/1997 |
| JP | 1-228887 | A | | 3/1988 |
| JP | 05-246131 | A | | 9/1993 |
| JP | 10-183022 | A | | 7/1998 |
| JP | 10-329405 | A | | 12/1998 |

* cited by examiner

*Primary Examiner*—Callie Shosho
(74) *Attorney, Agent, or Firm*—Webb Ziesenheim Logsdon Orkin & Hanson, P.C.

(57) ABSTRACT

The invention provides a recording sheet having an ink-receiving layer, which comprises a substrate sheet and an ink-receiving layer formed thereon, said ink-receiving layer comprising oxide particles, wherein the ink-receiving layer has pores having a diameter in the range of 3.4 to 2,000 nm, the pore volume of pores having a diameter of 3.4 to 30 nm is in the range of 0.2 to 1.8 ml/g, and the pore volume of pores having a diameter of 30 to 2,000 nm is in the range of 0.1 to 1.5 ml/g. It is preferable that the oxide particles have an average particle diameter of 2 to 1,000 nm and are a mixture of hydrophobic oxide particles and hydrophilic oxide particles. This recording sheet shows sufficient strength, has excellent printability such that images of uniform density and high sharpness can be printed thereon without bleeding, and is excellent in water resistance, weathering resistance and fading resistance.

2 Claims, No Drawings

COATING LIQUID FOR FORMING INK-RECEIVING LAYER

CROSS-REFERENCE TO RELATED APPLICATION

This is a divisional of U.S. patent application Ser. No. 09/220,134 filed Dec. 23, 1998 now U.S. Pat. No. 6,447,881.

FIELD OF THE INVENTION

The present invention relates to a recording sheet having an ink-receiving layer, which comprises a substrate sheet made of, for example, a resin such as PET or polyvinyl chloride, paper, steel, fabrics or cloths, and an ink-receiving layer formed thereon. More particularly, the invention relates to a recording sheet having an ink-receiving layer, on which images of uniform density and high sharpness can be printed without bleeding and which is able to provide a printed matter having not only excellent water resistance, weathering resistance and fading resistance but also sufficient strength.

The present invention also relates to a coating liquid for forming the ink-receiving layer.

BACKGROUND OF THE INVENTION

An ink-jet printing method has advantages such that the method can provide printing matter of good image qualities similar to those obtained by a conventional multi-color printing method or color photographic method, that it is easy to adapt the ink-jet printing method to a high speed printing and a multi-color printing, and that even in case where the number of copies per one set is not so large, printing can be made at a lower cost as compared with conventional printing methods. Therefore, the ink-jet printing method has rapidly come into wide use in various purposes.

In the ink-jet printing method, however, an aqueous ink is used to print on a recording sheet which is generally obtained by coating a substrate sheet with a water-soluble polymer such as polyvinyl alcohol to form an ink-receiving layer. Therefore, this method has a problem that the printed recording sheet has poor water resistance to lead to deterioration of the image quality when the printed recording sheet is placed in a high-humidity environment or is wet. There is another problem that a highly sharp and accurate printed image cannot be obtained because such a recording sheet conventionally used has not a sufficient ink absorption capacity.

In order to solve the above problems, recording sheets having an ink-receiving layer which contains fine particles of silica, alumna or the like and which is formed on a substrate sheet have been proposed.

For example, Japanese Patent Laid-Open Publication No. 149475/1987 discloses a recording sheet having an ink-receiving layer containing spherical particles of silica having an average particle diameter of 1 to 50 $\mu$m. Japanese Patent Publication No. 24906/1991 discloses a recording medium having an ink-receiving layer containing a cationic hydrated aluminum oxide. Japanese Patent Publication No. 19037/1992 discloses a recording medium having an ink-receiving layer containing a cationic colloidal silica. Japanese Patent Laid-Open Publication No. 115984/1992 discloses a recording sheet wherein a substrate is provided with a layer of pseudo-boehmite alumina on which a layer of porous silica is further provided. Japanese Patent Laid-Open Publication No. 55829/1994 discloses a recording sheet wherein a substrate is provided with a layer of porous silica particles having an average particle diameter of 2 to 50 $\mu$m, an average pore diameter of 8 to 50 nm and a pore volume of 0.8 to 2.5 cc/g on which a pseudo-boehmite porous layer obtained by drying an alumina sol is further provided.

Most of the recording sheets mentioned above are intended to be used for printing with dye-based inks. Since the dye-based inks are poor in the weathering resistance, the resulting printed matter has drawbacks of discoloration or fading caused by exposure to ultraviolet light, oxygen or ozone. Such drawbacks are conspicuously brought about especially when the printed matter is used outdoors.

For the above reasons, pigment-based inks exhibiting excellent weathering resistance have come to be used even in the ink-jet printing method.

However, the pigment particles usually have diameter of 10 to 500 nm, and the conventional ink-receiving layers do not have pores capable of absorbing such large particles effectively, so that the pigment particles are hardly absorbed by the ink-receiving layer and then remain on the surface of the layer. Thus, there is a further problem that the printed recording sheets have insufficient water resistance or insufficient abrasion resistance and the pigment particles may come off by rubbing, thereby resulting in removal of the color component.

OBJECT OF THE INVENTION

The present invention has been made to solve such problems associated with the prior art as described above, and it is an object of the invention to provide a recording sheet having an ink-receiving layer, which has excellent printability such that images of uniform density and high sharpness can be printed thereon without bleeding, and which has not only excellent water resistance, weathering resistance and fading resistance, but also sufficient strength.

It is another object of the invention to provide a recording sheet having an ink-receiving layer, which is particularly preferable for high-speed printing using an ink-jet method, which is employable not only with dye-based inks but also with pigment-based inks, and which is favorably used, for example, as a recording sheet for a large-sized color printer made from white PET or art paper, and also as a recording sheet with a substrate having no absorbing capacity and requiring transparency.

It is a further object of the invention to provide a coating liquid for forming the ink-receiving layer.

SUMMARY OF THE INVENTION

The recording sheet having an ink-receiving layer according to the invention is a recording sheet which comprises a substrate sheet and an ink-receiving layer containing oxide particles formed on the substrate sheet, wherein the ink-receiving layer has pores having a diameter in the range of 3.4 to 2,000 nm, the pore volume of pores having a diameter of 3.4 to 30 nm is in the range of 0.2 to 1.8 ml/g, preferably 0.5 to 1.5 ml/g, and the pore volume of pores having a diameter of 30 to 2,000 nm is in the range of 0.1 to 1.5 ml/g, preferably 0.2 to 1.2 ml/g.

It is preferable that the oxide particles have an average diameter in the range of 2 to 1,000 nm and are a mixture of hydrophobic oxide particles whose surfaces have been made hydrophobic and hydrophilic oxide particles whose surfaces have not been made hydrophobic.

It is also preferable that the weight ratio of the hydrophobic oxide particles to the hydrophilic oxide particles in the mixture is in the range of 0.01 to 9.

The oxide particles are preferably silica particles or composite oxide particles comprising a silica component.

The coating liquid for forming an ink-receiving layer according to the invention is a coating liquid which comprises oxide particles, a binder and a dispersion medium consisting of water and/or an organic solvent, said oxide particles and said binder being dispersed in the dispersion medium, wherein the oxide particles have an average particle diameter of 2 to 1,000 nm and are a mixture of hydrophobic oxide particles whose surfaces have been made hydrophobic and hydrophilic oxide particles whose surfaces have not been made hydrophobic, and the hydrophobic oxide particles and the hydrophilic oxide particles are agglomerate particles.

DETAILED DESCRIPTION OF THE INVENTION

The recording sheet having an ink-receiving layer according to the invention is described in detail hereinafter.

Recording Sheet Having Ink-recording Layer

The recording sheet having an ink-receiving layer according to the invention comprises a substrate sheet and an ink-receiving layer formed on the substrate sheet.

Substrate Sheet

The substrate sheet is described below.

There is no specific limitation on the substrate sheet for use in the invention, and, for example, films of resins such as PET and polyvinyl chloride, various types of paper, steel plates, fabrics and cloths.

Ink-receiving Layer

The ink-receiving layer of the recording sheet of the invention is described below.

The ink-receiving layer formed on the substrate sheet comprises oxide particles and a binder.

Oxide Particles

The oxide particles for use in the invention have an average particle diameter of usually 2 to 1,000 nm, preferably 5 to 500 nm. When the average particle diameter of the oxide particles is smaller than 2 nm, pores having a pore diameter of not less than 30 nm are hardly formed in the ink-receiving layer, and thus pigment particles in a pigment-based ink may be absorbed only at a reduced rate, or may not be absorbed by the ink-receiving layer. When the average particle diameter of the oxide particles exceeds 1,000 nm, various problems such as lowering of strength and transparency of the ink-receiving layer, lowering of contrast and occurrence of bleeding may be brought about. The average particle diameter can be determined by a dynamic light scattering method (Nicomp Model 370 manufactured by Pacific Scientific Co.), for which a stirred dispersion of the particles in water is prepared. The shape of the oxide particle for use in the invention is not specifically limited, and preferable are shapes other than a spherical shape.

The oxide particles for use in the invention are generally agglomerate particles (i.e. secondary particles), wherein primary particles are agglomerated to such an extent that the secondary particles do not separate into primary particles when the ink-receiving layer is formed. The primary particles constituting the secondary particles are preferably those having an average particle diameter of 2 to 100 nm. The average particle diameter of the primary particles can be calculated using the specific surface area measured by the BET method on the assumption that the primary particles are spheres to obtain an average diameter of the spheres. The agglomerate particles for use in the invention may contain primary particles remained without agglomeration or separated from the agglomerate particles.

In the present invention, it is preferable to employ a mixture of oxide particles whose surfaces have been made hydrophobic (hydrophobic oxide particles) and oxide particles whose surfaces have not been made hydrophobic (hydrophilic oxide particles). The weight ratio of the hydrophobic oxide particles to the hydrophilic oxide particles in the mixture is preferably in the range of 0.01 to 9, more preferably 0.02 to 5. When the weight ratio is outside of the above range, an ink-receiving layer having the aforesaid pore volume and pore size distribution based on the diameter may not be obtained even if the average particle diameter of the oxide particles is within the above range.

It is thought that if a mixture of the hydrophilic particles and the hydrophobic particles is used, new agglomerate particles wherein both particles are coordinated to each other are formed. Such particles have excellent dispersibility in the binder, so that during the formation of an ink-receiving layer, cracking of the layer caused by uneven shrinkage does not take place. Further, owing to the hydrophobic particles, adsorption or permeation of water into the ink-receiving layer hardly takes place, and thus the water resistance of the ink-receiving layer can be improved.

There is no specific limitation on the method to make the surfaces of the oxide particles hydrophobic. For example, the hydrophobic oxide particles can be produced by treating the surfaces of hydrophilic oxide particles as described below with a coupling agent such as monomethylsilane, monomethyltrimethoxysilane, monomethyltriethoxysilane, dimethyldimethoxysilane, dimethylvinylmethoxysilane, phenyltriethoxysilane, diphenyldimethoxysilane, vinylitrichlorosilane, or γ-glycidoxypropyltrimethoxysilane.

When silica particles or composite oxide particles comprising a silica component are used as the hydrophilic oxide particles to be treated by the silane compound as a coupling agent, the silane compound is added to, preferably in the molar ratio of 0.05 to 0.9 based on the ratio of the silane compound to the silica particles or silica component contained in the composite oxide particles.

When other oxide particles are used as the hydrophilic oxide particles to be treated by the silane compound as a coupling agent, the silane compound is added to, preferably in the molar ratio of 0.05 to 0.5 based on the ratio of the silane compound to the oxide particles.

Examples of the hydrophilic oxide particles employable in the invention include particles of various oxides such as silica, alumina, zirconia, titania, zinc oxide and mixtures thereof. Of these, silica particles are particularly preferable.

As the oxide particles, also employable are particles of composite oxides comprising a silica component, such as particles of silica-alumina, silica-zirconia, silica-zinc oxide, silica-magnesia, silica-titania, silica-alumina-magnesia and clay minerals.

These oxide particles can be produced by processes conventionally known, for example, by thermal decomposition or hydrolysis of metal alkoxides, metal salts or mixtures thereof. The oxide particles thus obtained may be subjected to pulverization, if desired.

Binder

Examples of the binders employable in the invention include organic compounds, such as polyvinyl alcohol, modified polyvinyl alcohol, polyvinyl pyrrolidone and other hydrophilic polymers. These compounds may be further modified prior to use. The binders may be used alone or in combination.

The amount of the binder to be used may vary depending on the type thereof, and is preferably 5 to 60% by weight, more preferably 10 to 40% by weight, based on the oxide particles.

When the amount of the binder is less than 5% by weight, the ink-receiving layer may be easily peeled from the substrate sheet because of insufficient adhesion to the substrate sheet, and besides the strength of the ink-receiving layer may be insufficient. When the amount of the binder exceeds 60% by weight, the ink-receiving layer may absorb the ink in a decreased amount, or may have reduced water resistance.

The ink-receiving layer of the invention may further contain additives, for example, antioxidants, organic polymers such as cellulose and derivatives thereof, bio-fibers, inorganic polymers, inorganic fine particles, in addition to the oxide particles and the binder.

Process for Forming Ink-receiving Layer

For forming the ink-receiving layer on the substrate sheet, conventionally known processes are available, and a preferable process can be selected depending on the type of the substrate sheet.

Specifically, a coating liquid for forming an ink-receiving layer, which is described later, is applied onto the substrate sheet by, for example, any of spraying, roll coating, blade coating, bar coating and curtain coating, and then the coating film is dried, to form the ink-receiving layer.

The substrate sheet may be previously subjected to a primer treatment.

The ink-receiving layer thus formed generally has pores having a diameter in the range of 3.4 to 2,000 nm. The pore volume of pores having a diameter of 3.4 to 30 nm is in the range of 0.2 to 1.8 ml/g, preferably 0.5 to 1.5 ml/g, and the pore volume of pores having a diameter of 30 to 2,000 nm is in the range of 0.1 to 1.5 ml/g, preferably 0.2 to 1.2 ml/g.

When the pore volume of pores having a diameter of 3.4 to 30 nm is less than 0.2 ml/g, the ink-receiving layer may show bleeding because of its small ink absorption capacity, and an image of high sharpness and high accuracy may not be obtained. When the pore volume of pores having a diameter of 3.4 to 30 nm is larger than 1.8 ml/g, the ink-receiving layer may have reduced ability to fix the pigments, or may have reduced strength.

When the pore volume of pores having a diameter of 30 to 2,000 nm is less than 0.1 ml/g, the ink-receiving layer may not absorb sufficiently a pigment-based ink and then remain the pigment particles on the surface of the layer, and the remaining particles may be removed by rubbing and then come off the color from the printed recording sheet (color rub-off). When the pore volume of pores having diameters of 30 to 2,000 nm is larger than 1.5 ml/g, the ink-receiving layer may have reduced ability to fix the pigments, or, after printing, most of the pigment particles may sink together to the lower side of the ink-receiving layer (in the vicinity of the substrate sheet) to provide images lacking in sharpness.

The thickness of the ink-receiving layer to be formed on the substrate sheet can be arbitrarily determined depending on, for example, the thickness of the substrate sheet, purposes of the printed matter and the type of the printing ink, and it is preferable that the thickness of the ink-receiving layer is in the range of usually 5 to 100 μm. When the thickness of the ink-receiving layer is less than 5 μm, the layer may not have a sufficient ink absorption capacity and then cause bleeding, or in the case where a small amount of an ink is used, the color strength may be decreased. On the other hand, it is difficult to form an ink-receiving layer having a thickness of greater than 100 μm by one coating operation, and repeated coating operations are not only time consuming and uneconomical, but also may bring about cracking or peeling of the coating film (ink-receiving layer) during it is dried.

In the present invention, the pore volume of pores in the ink-receiving layer formed on the substrate sheet is determined by the mercury penetration method described below.

Specifically, about 0.2 to 0.3 g of the produced recording sheet having an ink-receiving layer is inserted into a measuring cell (volume: 0.5 cc), and the pore distribution is measured by AUTOSCAN-60 POROSIMETER (manufactured by QUANTA CHROME Co.) under the conditions of a mercury contact angle of 130°, a mercury surface tension of 473 dyn/cm$^2$ and by selecting a measuring range of "high-pressure". From the measured pore distribution, a pore volume of pores having a diameter of 3.4 to 30 nm and a pore volume of pores having a diameter of 30 to 2,000 nm are calculated, and then, using the weight of the ink-receiving layer of the recording sheet, a pore volume based on 1 g of the receiving layer is calculated.

Coating Liquid for Forming Ink-receiving Layer

The coating liquid for forming an ink-receiving layer according to the invention comprises oxide particles, a binder and a dispersion medium consisting of water and/or an organic solvent, said oxide particles and said binder being dispersed in the dispersion medium.

It is desired that the oxide particles have an average particle diameter of 2 to 1,000 nm, preferably 5 to 500 nm. The oxide particles for use in the invention is preferably a mixture of hydrophobic oxide particles whose surfaces have been made hydrophobic and hydrophilic oxide particles whose surfaces have not been made hydrophobic. The hydrophobic oxide particles and the hydrophilic oxide particles are agglomerate particles, respectively and each other. Examples of the oxide particles and the binders are those previously described.

Examples of the organic solvents include isopropyl alcohol, ethanol and butanol. These solvents may be used alone or in combination.

The concentration of the oxide particles in the coating liquid can be properly determined depending on the coating method, and it is desired that the concentration is in the range of preferably 2 to 40% by weight, particularly preferably 5 to 30% by weight. The amount of the binder is in the range of 5 to 60% by weight, preferably 10 to 40% by weight, based on the oxide particles.

The coating liquid according to the invention can contain conventional additives and auxiliaries which serve, for example, to improve adhesion between the ink-receiving layer and the substrate sheet, to increase strength and weathering resistance of the ink-receiving layer, and to control the pore structure of the ink-receiving layer, such as antioxidants, organic polymers (e.g. cellulose), bio-fibers, inorganic polymers and other inorganic fine particles.

EFFECT OF THE INVENTION

The recording sheet having an ink-receiving layer according to the invention can absorb an ink at an increased rate because the ink-receiving layer has a specific pore structure. The ink-receiving layer has excellent strength, water resistance, weathering resistance and heat resistance. Moreover, the recording sheet having an ink-receiving layer shows excellent printability independent of printing methods, and printing of high sharpness can be made thereon using various inks. The recording sheet is particularly favorable for printing with pigment-based inks.

Printed matter obtained by the use of the recording sheet has excellent water resistance and weathering resistance.

By the use of the coating liquid for forming an ink-receiving layer according to the invention, an ink-receiving layer having the above-mentioned excellent properties can be formed.

EXAMPLE

The present invention is further described with reference to the following examples, but it should be construed that the invention is in no way limited to those examples.

Example 1

Preparation of Metal Oxide Particles

Sulfuric acid having a concentration of 5% by weight was added to a solution of water glass (sodium silicate) having a $SiO_2$ concentration of 5% by weight to produce a gel. The gel was subjected to filtration and to washing to obtain a cake of a silica hydrogel having a solid content of 10% by weight. The cake of the silica hydrogel was mixed with butanol in a weight ratio of 1:1, and the mixture was filtered after stirring and dried at 200° C. to obtain hydrophilic silica particles by using a general method.

The silica particles were dispersed in a mixed solvent of water and ethanol (weight ratio=1:1) in such a manner that the resulting dispersion has a solid content of 10% by weight. For treatment of the silica particles, methyltrimethoxysilane was added to the dispersion in a molar ratio of 0.15 based on the ratio of the silane compound to the silica. Then, the dispersion was filtered after stirring and dried at 200° C. to obtain hydrophobic silica particles.

Preparation of Coating Liquid for Forming Ink-receiving Layer 80 parts by weight of a dispersion of the hydrophilic silica particles in water having a solid content of 15% by weight, 20 parts by weight of a dispersion of the hydrophobic silica particles in isopropyl alcohol having a solid content of 15% by weight, and 37.5 parts by weight of a polyvinyl alcohol aqueous solution having a concentration of 10% by weight were mixed to obtain a coating liquid shown in Table 1. The average particle diameter of the oxide particles in the coating liquid was 160 nm, and the average particle diameter of primary particles constituting the oxide particles was 7 nm.

Preparation of Recording Sheet

The coating liquid obtained above was applied to a PET film by means of a bar coater, then dried and heated at 140° C. to prepare a recording sheet. The thickness of the ink-receiving layer was 30 μm. The pore volume of pores in the ink-receiving layer was determined by the aforesaid mercury penetration method.

The recording sheet obtained above was printed and then evaluated, both in the following manners:

Printing

On the recording sheet, a solid pattern W of 2 cm square was printed with a pigment-based ink by means of an ink-jet printer (Masterjet manufactured by GRAPHTEC Co.). In the printing, the colors used were magenta, black, cyan and yellow, and the output power was varied to alter the density.

Density

The density was measured by a color reflection densitometer (KRD-2200 manufactured by Nippon Denshoku Kogyo K.K.). The printed matter having a density of not less than 1.2 is satisfactorily used without any problem.

Bleeding

The shape of each dot of the printed pattern was observed under a microscope, and the bleeding was evaluated based on the following criteria.

AA: Completely circular dots free from bleeding.

BB: Dots other than the above.

Drying Rate

Two dots of different colors overlapping each other were observed under a microscope to examine whether or not the colors were mixed, and the drying rate was evaluated based on the following criteria.

AA: Mixing of colors was not observed.

BB: Mixing of colors was observed.

Water Resistance

A strip of the printed recording sheet was immersed in water to observe elution of the pigment, and the water resistance was evaluated based on the following criteria.

AA: Neither bleeding nor elution of the pigment was observed.

BB: Bleeding or elution of the pigment were observed.

Color Rub-off

The printed area was rubbed with a finger to examine change of image quality and attachment of the pigment to the finger, and the color rub-off was evaluated based on the following criteria.

AA: The image quality was not changed and the pigment did not attach to the finger.

BB: The image quality was changed or the pigment attached to the finger.

The results are as shown in Table 2.

Example 2

Preparation of Metal Oxide Particles

Silica-alumina particles with a form of composite oxides (Thixolex 427, available from Kanfutsu Chemical Co., average particle diameter of oxide particles: 800 nm, average particle diameter of primary particles: 45 nm) were used as hydrophilic oxide particles, and were dispersed in a mixed solvent of water and ethanol (weight ratio=1:1) in such a manner that the resulting dispersion has a solid content of 10% by weight. For treatment of the silica-alumina particles, methyltrimethoxysilane was added to the dispersion, in a molar ratio of 0.2 based on the ratio of the silane compound to the silica component contained in the silica-alumina. Then, the dispersion was filtered after stirring and dried at 200° C. to obtain hydrophobic silica-alumina particles.

Preparation of Coating Liquid for Forming Ink-receiving Layer 80 parts by weight of a dispersion of the hydrophilic silica-alumina particles in water having a solid content of 15% by weight, 20 parts by weight of a dispersion of the hydrophobic silica-alumina particles in isopropyl alcohol having a solid content of 15% by weight, and 37.5 parts by weight of a polyvinyl alcohol aqueous solution having a concentration of 10% by weight were mixed to obtain a coating liquid shown in Table 1. The average particle diameter of the oxide particles in the coating liquid was 810 nm, and the average particle diameter of primary particles constituting the oxide particles was 45 nm.

Preparation of Recording Sheet

The coating liquid obtained above was applied to a PET film by means of a bar coater, then dried and heated at 140° C. to prepare a recording sheet. The thickness of the ink-receiving layer was 30 μm. The recording sheet obtained was subjected to printing and evaluated in the same manner as in Example 1.

The results are as shown in Table 2.

Example 3

Preparation of Metal Oxide Particles

An aqueous solution of sodium silicate (water glass) having a $SiO_2$ concentration of 5% by weight, an aqueous solution of aluminum sulfate having a concentration of 5% by weight and an aqueous solution of magnesium carbonate having a concentration of 5% by weight were mixed to produce a gel. The gel was subjected to filtration and to washing to obtain a cake of a silica-alumina-magnesia hydrogel having a solid content of 10% by weight. The cake of the silica-alumina-magnesia hydrogel was mixed with butanol in a weight ratio of 1:1, and the mixture was filtered after stirring and dried at 200° C. to obtain hydrophilic silica-alumina-magnesia particles.

The silica-alumina-magnesia particles were dispersed in a mixed solvent of water and ethanol (weight ratio=1:1) in such a manner that the resulting dispersion has a solid content of 10% by weight. For treatment of the silica-alumina-magnesia particles, methyltrimethoxysilane was added to the dispersion, in a molar ratio of 0.5 based on the ratio of the silane compound to the silica component contained in the silica-alumina-magnesia. Then, the dispersion was filtered after stirring and dried at 200° C. to obtain hydrophobic silica-alumina-magnesia particles.

Preparation of Coating Liquid for Forming Ink-receiving Layer 80 parts by weight of a dispersion of the hydrophilic silica-alumina-magnesia particles in water having a solid content of 15% by weight, 20 parts by weight of a dispersion of the hydrophobic silica-alumina-magnesia particles in isopropyl alcohol having a solid content of 15% by weight, and 37.5 parts by weight of a polyvinyl alcohol aqueous solution having a concentration of 10% by weight were mixed to obtain a coating liquid shown in Table 1. The average particle diameter of the oxide particles in the coating liquid was 405 nm, and the average particle diameter of primary particles constituting the oxide particles was 18 nm.

Preparation of Recording Sheet

The coating liquid obtained above was applied to a PET film by means of a bar coater, then dried and heated at 140° C. to prepare a recording sheet. The thickness of the ink-receiving layer was 30 μm. The recording sheet obtained was subjected to printing and evaluated in the same manner as in Example 1.

The results are as shown in Table 2.

Comparative Example 1

Metal Oxide Particles

As metal oxide particles, an alumina sol (Cataloid AS-3, available from Catalysts & Chemicals Industries Co. Ltd., average particle diameter of oxide particles: 200 nm, average particle diameter of primary particles: 9 nm) was used.

Preparation of Coating Liquid for Forming Ink-receiving Layer 100 parts by weight of a dispersion of the alumina sol in water having a solid content of 15% by weight and 37.5 parts by weight of a polyvinyl alcohol aqueous solution having a concentration of 10% by weight were mixed to obtain a coating liquid shown in Table 1.

Preparation of Recording Sheet

The coating liquid obtained above was applied to a PET film by means of a bar coater, then dried and heated at 140° C. to prepare a recording sheet. The thickness of the ink-receiving layer was 30 μm. The recording sheet obtained was subjected to printing and evaluated in the same manner as in Example 1.

The results are as shown in Table 2.

Comparative Example 2

Metal Oxide Particles

As hydrophilic metal oxide particles, a silica sol (Cataloid SI-50, available from Catalysts & Chemicals Industries Co. Ltd., dispersed as primary particles with an average particle diameter of 25 nm) was used.

Preparation of Coating Liquid for Forming Ink-receiving Layer 100 parts by weight of a dispersion of the silica sol in water having a solid content of 15% by weight and 37.5 parts by weight of a polyvinyl alcohol aqueous solution having a concentration of 10% by weight were mixed to obtain a coating liquid shown in Table 1.

Preparation of Recording Sheet

The coating liquid obtained above was applied to a PET film by means of a bar coater, then dried and heated at 140° C. to prepare a recording sheet. During this, cracks were observed in the ink-receiving layer of the sheet, so that the aforesaid evaluation could formed.

TABLE 1

| | Type of oxide particles in the coating liquid | Average particle diameter (nm) | Average particle diameter of primary particles (nm) | Hydrophilic to Hydrophobic particles |
|---|---|---|---|---|
| Ex. 1 | Silica | 160 | 7 | 1/1 |
| Ex. 2 | Silica-alumina | 810 | 45 | 1/1 |
| Ex. 3 | Silica-alumina-magnesia | 405 | 18 | 1/1 |
| Comp. Ex. 1 | Alumina | 200 | 9 | — |
| Comp. Ex. 2 | Silica | 25 | 25* | — |

*In Comparative Example 2, the particles are not agglomerate particles but are original primary particles which have not been agglomerated.

TABLE 2

| | Type of oxide particles | Pore volume (ml/g) Pore diameter (nm) 3.4–30 | 30–2000 | Density | Bleed-ing | Drying rate | Water resist-ance | Color rub-off |
|---|---|---|---|---|---|---|---|---|
| Ex. 1 | Silica | 1.09 | 0.86 | 1.7 | AA | AA | AA | AA |
| Ex. 2 | Silica-alumina | 0.86 | 1.12 | 1.6 | AA | AA | AA | AA |
| Ex. 3 | Silica-alumina-magnesia | 1.21 | 0.71 | 1.6 | AA | AA | AA | AA |
| Comp Ex. 1 | Alumina | 1.07 | 0.14 | 1.6 | AA | AA | BB | BB |
| Comp Ex. 2 | Silica | Cracked | | —* | —* | —* | —* | —* |

* In Comparative Example 2, the ink-receiving layer was cracked, so that it was impossible to perform the evaluation.

What is claimed is:

1. A coating liquid for forming an ink-receiving layer which comprises oxide particles, a binder and a dispersion medium consisting of water and/or an organic solvent, said oxide particles and said binder being dispersed in the dispersion medium, wherein:

the oxide particles which are agglomerate particles have an average particle diameter of 2 to 1,000 nm and are a mixture of hydrophobic oxide particles whose surfaces have been made hydrophobic and hydrophilic oxide particles whose surfaces have not been made hydrophobic, and the hydrophobic oxide particles and hydrophilic oxide particles are agglomerate particles, the weight ratio of the hydrophobic oxide particles to the hydrophilic oxide particles in the mixture is in the range of 0.01 to 9, and the oxide particles are composite oxide particles comprising a silica component.

2. A coating liquid for forming an ink-receiving layer which comprises oxide particles, a binder and a dispersion medium consisting of water and/or an organic solvent, said oxide particles and said binder being in the dispersion medium, wherein:

the oxide particles which are agglomerate particles have an average particle diameter of 2 to 1,000 nm and are a mixture of hydrophobic oxide particles whose surfaces have been made hydrophobic and hydrophilic oxide particles whose surfaces have not been made hydrophobic, and the hydrophobic oxide particles and hydrophilic oxide particle are agglomerate particles and the oxide particles are composite oxide particles comprising a silica component.

* * * * *

UNITED STATES PATENT AND TRADEMARK OFFICE

CERTIFICATE OF CORRECTION

PATENT NO. : 6,740,702 B2
DATED : May 25, 2004
INVENTOR(S) : Nishida et al.

It is certified that error appears in the above-identified patent and that said Letters Patent is hereby corrected as shown below:

Column 12,
Line 23, "being in the dispersion medium" should read -- being dispersed in the dispersion medium --
Line 32, "hydrophilic oxide particle" should read -- hydrophilic oxide particles --

Signed and Sealed this

Thirtieth Day of November, 2004

JON W. DUDAS
*Director of the United States Patent and Trademark Office*